US009773292B2

(12) United States Patent
Ramadoss et al.

(10) Patent No.: US 9,773,292 B2
(45) Date of Patent: Sep. 26, 2017

(54) GRAPHICS WORKLOAD SUBMISSIONS BY UNPRIVILEGED APPLICATIONS

(71) Applicant: Intel Corporation, Santa Clara, CA (US)

(72) Inventors: Murali Ramadoss, Folsom, CA (US); Nishanth R. Pendluru, Folsom, CA (US); Jeffrey S. Frizzell, Folsom, CA (US); Ankur N. Shah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 14/315,626

(22) Filed: Jun. 26, 2014

(65) Prior Publication Data

US 2015/0379662 A1 Dec. 31, 2015

(51) Int. Cl.
*G06T 1/20* (2006.01)
*G06F 9/50* (2006.01)

(52) U.S. Cl.
CPC .............. *G06T 1/20* (2013.01); *G06F 9/5044* (2013.01); *G06F 2209/509* (2013.01)

(58) Field of Classification Search
None
See application file for complete search history.

(56) References Cited

U.S. PATENT DOCUMENTS

| | | | | |
|---|---|---|---|---|
| 6,070,219 | A * | 5/2000 | McAlpine | H04L 29/06 370/230 |
| 8,478,907 | B1 * | 7/2013 | Aloni | G06F 13/128 709/225 |
| 2004/0187122 | A1 | 9/2004 | Gosalia et al. | |
| 2006/0146057 | A1 | 7/2006 | Blythe | |
| 2007/0168641 | A1 * | 7/2007 | Hummel | G06F 9/45558 711/206 |
| 2009/0160867 | A1 | 6/2009 | Grossman | |
| 2011/0084964 | A1 * | 4/2011 | Gould | G06T 15/005 345/426 |
| 2011/0084965 | A1 * | 4/2011 | Gould | G06T 15/005 345/426 |
| 2011/0210976 | A1 | 9/2011 | Diard | |
| 2011/0271014 | A1 * | 11/2011 | Turner | G06F 12/1081 710/22 |
| 2012/0147021 | A1 * | 6/2012 | Cheng | G06F 9/545 345/522 |

(Continued)

OTHER PUBLICATIONS

Shi, Lin, et al. "vCUDA: GPU-accelerated high-performance computing in virtual machines." IEEE Transactions on Computers 61.6 (2012): 804-816.*

(Continued)

*Primary Examiner* — Yu Chen
(74) *Attorney, Agent, or Firm* — Jordan IP Law, LLC (57) ABSTRACT

Methods and systems may provide for receiving, at a controller, a notification of a workload submission by an application lacking system level privileges. Additionally, the controller may be used to schedule a transfer of the workload submission to a graphics hardware component for execution, wherein the controller has system level privileges. In one example, the transfer bypasses an operating system and a kernel mode driver associated with the graphics hardware component.

16 Claims, 6 Drawing Sheets

(56) References Cited

U.S. PATENT DOCUMENTS

| | | | |
|---|---|---|---|
| 2012/0188258 A1* | 7/2012 | McCrary | G06F 9/545 345/502 |
| 2013/0067468 A1* | 3/2013 | Tillier | G06F 9/545 718/1 |
| 2013/0159664 A1* | 6/2013 | Blinzer | G06F 9/3004 711/207 |
| 2013/0229421 A1* | 9/2013 | Cheng | G06T 1/20 345/522 |
| 2014/0026137 A1 | 1/2014 | Vembu et al. | |

OTHER PUBLICATIONS

International Search Report for International Application No. PCT/US2015/034890, dated Aug. 31, 2015, 4 pages, Patent Cooperation Treaty.

Written Opinion of the International Search Report for International Application No. PCT/US2015/034890, dated Aug. 31, 2015, 7 pages, Patent Cooperation Treaty.

* cited by examiner

GRAPHICS WORKLOAD SUBMISSIONS BY UNPRIVILEGED APPLICATIONS

BACKGROUND

Graphics related applications such as, for example, three dimensional (3D) rendering and media player applications, may not have privileges that provide for direct access to graphic processing unit (GPU) resources. Accordingly, a given graphics application residing at the relatively unprivileged "Ring 3" protection level (e.g., lacking system level privileges) might load a graphics user mode driver (UMD), which in turn submits workloads to an operating system (OS) and/or kernel mode driver (KMD) residing at the "Ring 0" protection level (e.g., having system level privileges). The OS may, for example, manage memory operations such as paging and the KMD may, for example, populate GPU command buffers and hardware registers with commands corresponding to the submitted workloads, wherein the GPU may use the commands to execute the workloads. The intermediate processing of the workloads by the OS and KMD may add to central processing unit (CPU) overhead and increase processing latency, which may have a negative impact on performance, power consumption and/or battery life.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
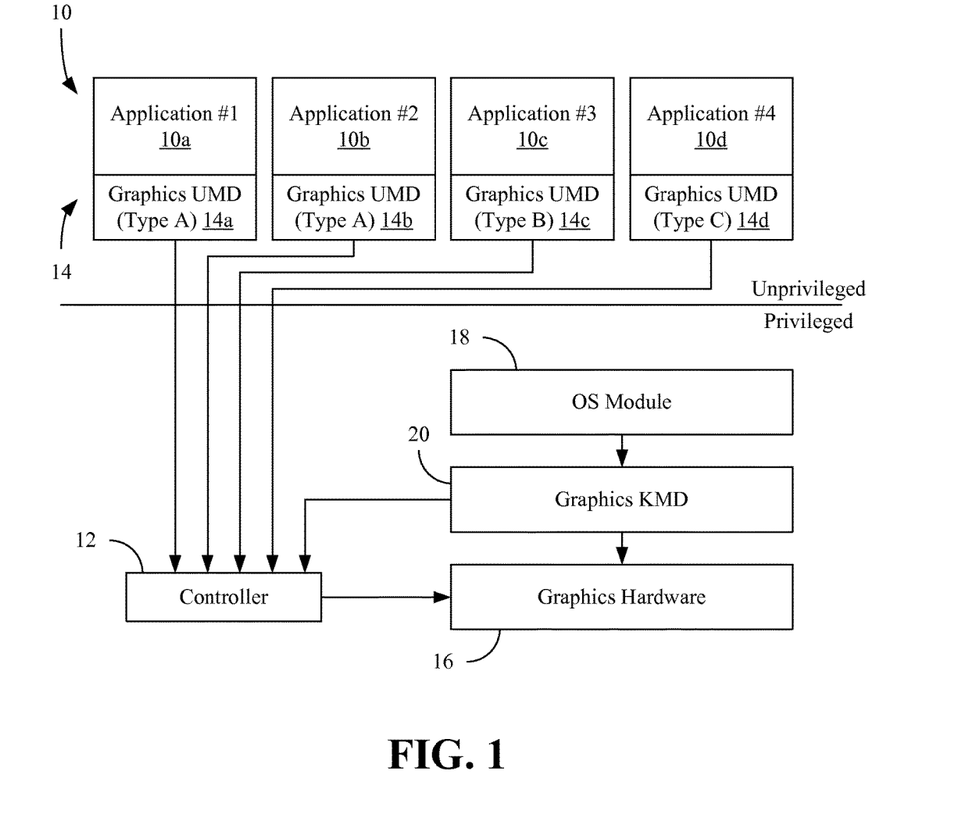
FIG. 1 is a block diagram of an example of a graphics workload submission environment according to an embodiment.

FIG. 1 shows an environment in which various applications 10 (10a-10d) operating at an unprivileged protection level (e.g., Ring 3 protection level) generate workloads associated with the visual output of images, video, graphics, data and/or other information via a display or other suitable device (not shown). For example, a first application 10a ("Application #1") might include a video game that displays three dimensional (3D) scenes, a second application 10b ("Application #2") may include a media player that provides for the playback of movies and/or video clips, a third application 10c ("Application #3") might include a web browser that streams online content, a fourth application 10d ("Application #4") may include an email program that displays messaging content, and so forth.

In the illustrated example, the applications 10 load various types of graphics user mode drivers (UMDs) 14 (14a-14d) and/or other middleware to facilitate workload submissions. For example, first and second UMDs 14a, 14b might be of a particular type ("Type A", e.g., DIRECTX, registered trademark of Microsoft Corporation), a third UMD 14c may be of another type ("Type B", e.g., OPENGL, registered trademark of Silicon Graphics, Inc.), a fourth UMD 14d might be of yet another type ("Type C", e.g., Open Computing Language/OPENCL, a mark of the Khronos Group), and so forth. The illustrated UMDs 14 submit the graphics workloads associated with the rendering of their respective content to a controller 12 (e.g., microcontroller, embedded controller). The controller 12 may reside at a privileged protection level (e.g., the controller is able to access hardware resources such as registers in the GPU) and have the authority to submit the workloads directly to graphics hardware (HW) 16, such as, for example, graphics processors, pipelines, registers, command buffers, queues, displays, and so forth.

Of particular note is that the illustrated transfer of the workload submissions bypass an operating system (OS) module 18 (e.g., associated with and/or running on a host processor, not shown) and a graphics kernel mode driver (KMD) 20 associated with and/or running on the graphics hardware 16. By offloading graphics scheduling from the OS module 18 and the KMD 20 to the controller 12, the illustrated may reduce latencies, reduce host processor overhead, improve performance, reduce power consumption, extend battery life, and so forth.

Figure 2:
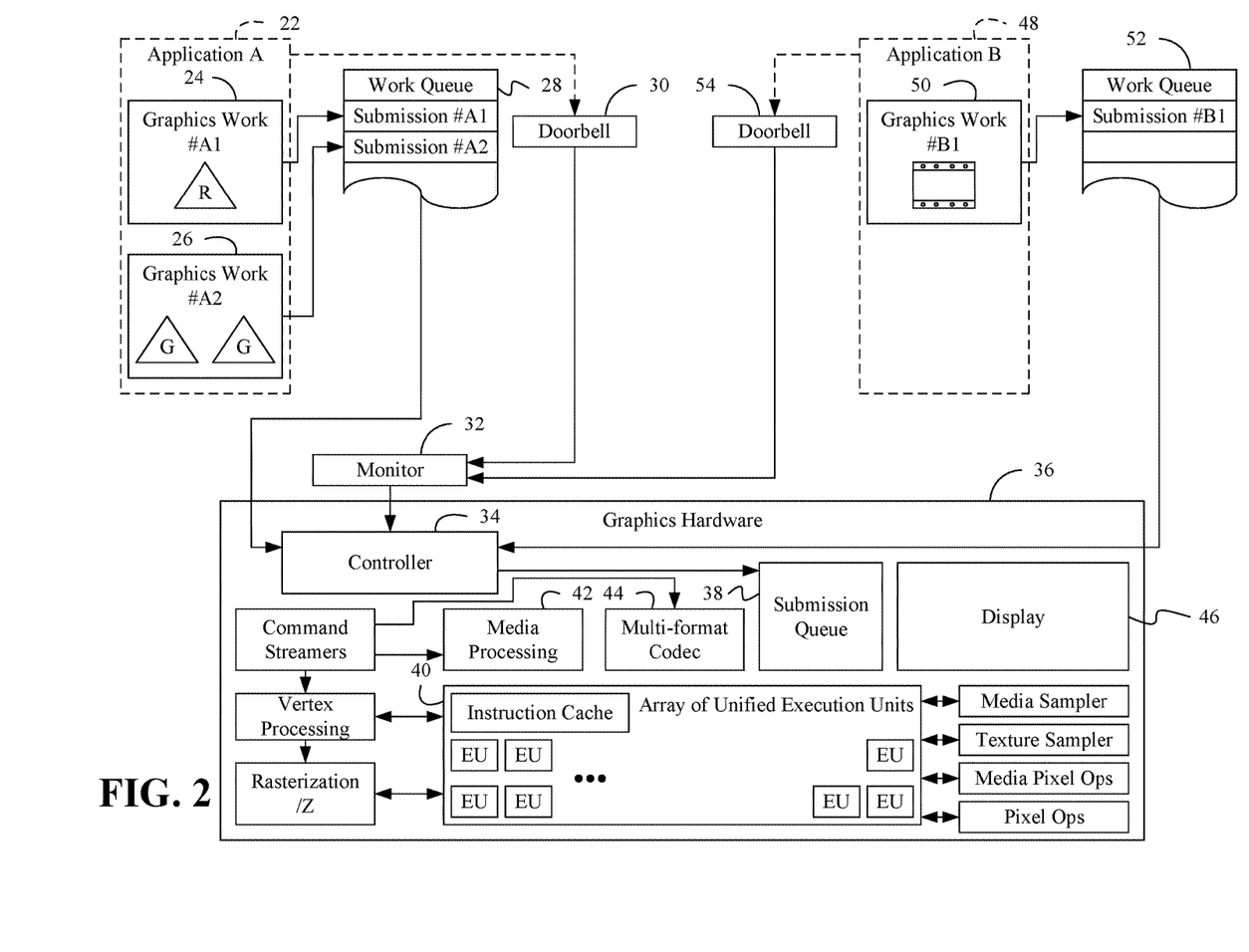
FIG. 2 is a block diagram of an example of a queue based graphics workload submission architecture according to an embodiment.

Turning now to FIG. 2, a queue based graphics workload submission architecture is shown. In the illustrated example, a first application 22 ("Application A") lacking system level privileges generates a first workload 24 ("Graphics Work #A1") involving, for example, the rendering of 3D content such as a red (R) primitive and submits (e.g., via a UMD, not shown) the first workload 24 to a work queue 28 (e.g., circular buffer) associated with the first application 22. Upon placement of the submission ("Submission #A1") of the first workload 24 in the work queue 28, the first application 22 may trigger a doorbell 30 by, for example, writing to a cache line or other address/memory location associated with the first application 22. A monitor 32 (e.g., interrupt handler or snoop module running in a memory device, not shown) may detect the triggering of the doorbell 30, identify the first application 22 based on doorbell address, and issue a notification of the workload submission by the first application 22 directly to a controller 34 having system level privileges. In one example, the notification is an interrupt.

The controller 34, which may be similar to the controller 12 (FIG. 1), already discussed, may execute firmware instructions (e.g., loaded by a driver running on the host processor, loaded from internal non-volatile memory/NVM, etc.) to receive the notification of the workload submission from the monitor 32, retrieve the workload submission from the work queue 28 and schedule a transfer of the workload submission to a component of graphics hardware 36 for execution. As already noted, the transfer of the workload submission may bypass the OS and/or KMD (not shown) in order to reduce host processor overhead and graphics submission time. More particularly, the controller 34 may parse the workload submission to obtain one or more commands, add the one or more commands to a submission queue 38 in the graphics hardware 36, and transfer the one or more commands from the submission queue 38 to other components of the graphics hardware 36 based on a graphics submission policy (e.g., timer expiration, work completion events).

Thus, the commands may be transferred directly from the submission queue 38 to components such as, for example, graphics pipeline components (e.g., command streamers, vertex processing, rasterization/Z buffering, media sampler, texture sampler, media pixel operations/Ops, pixel operations/Ops), execution unit components 40, media processing components 42, multi-format codec components 44, display components 46, and so forth. In addition, parsing the workload submission may involve, for example, modifying, adding and/or prioritizing commands, checking commands and ensuring that untrusted user mode applications cannot submit privileged commands to hardware (e.g., drop illegal commands), and so forth.

Similarly, a second application 48 ("Application B") lacking system level privileges may generate a second workload 50 ("Graphics Work #B1") involving, for example, the replay of media content. The illustrated second application 48 submits (e.g., via a UMD, not shown) the second workload 50 to a work queue 52 (e.g., circular buffer) associated with the second application 48. Upon placement of the submission ("Submission #B1") of the second workload 50 in the work queue 52, the second application 48 may trigger a doorbell 54 by, for example, writing to a cache line or other address/memory location associated with the second application 48. The monitor 32 may detect the triggering of the doorbell 54, identify the second application 48 based on the doorbell address, and issue a notification (e.g., DPC, interrupt) of the workload submission by the second application 48 directly to the controller 34 having system level privileges. The controller 34 may schedule a transfer of the workload submission to one or more components of the graphics hardware 36 without involving an OS module or KMD. A third workload 26 generated by the first application 22 may be similarly processed in a fashion that bypasses the OS and KMD. The controller 34 may be incorporated within the graphics hardware 36 or implemented external to the graphics hardware 36.

Figure 3A:
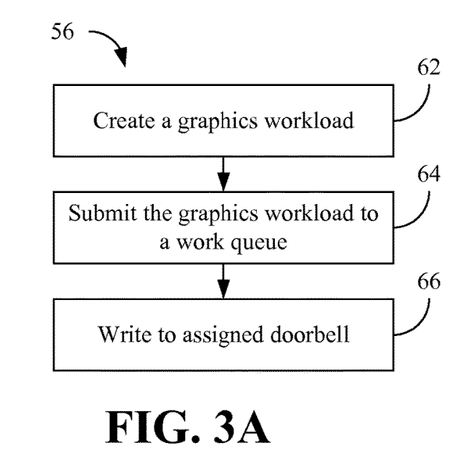
FIGS. 3A, 3B and 3C are flowcharts of examples of methods of operating an application, a memory device, and a controller, respectively, according to embodiments.
Figure 3B:
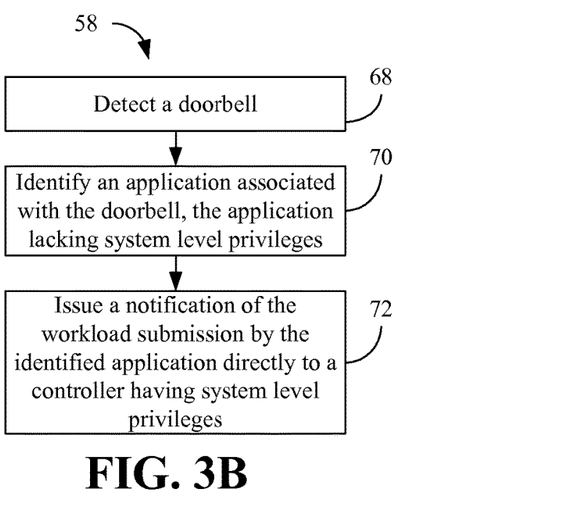
Figure 3C:
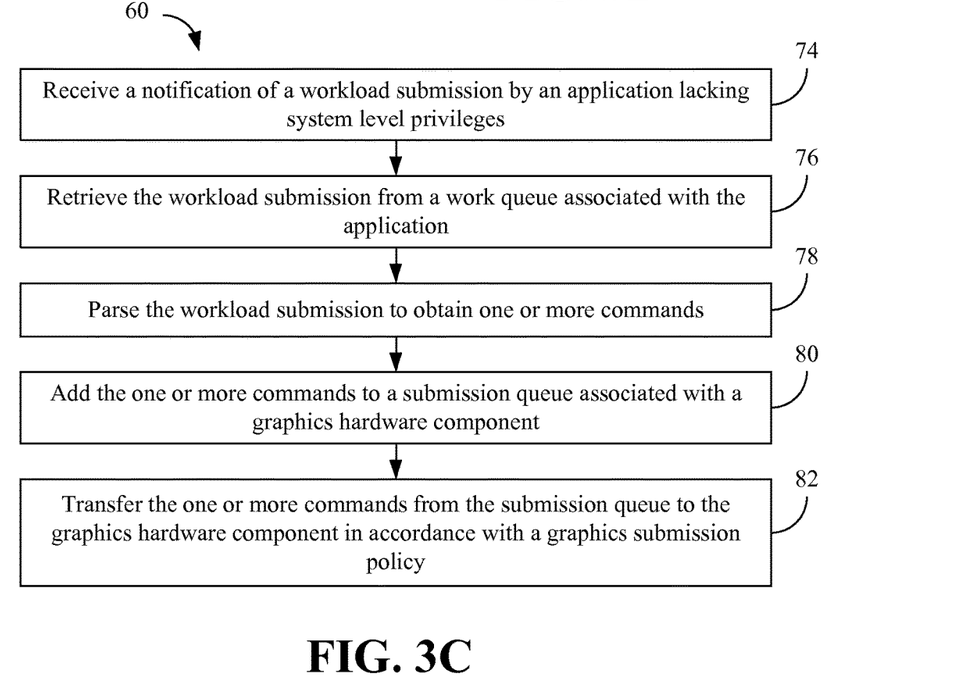

FIGS. 3A, 3B and 3C show methods 56, 58 and 60 of operating an application, a memory device, and a controller, respectively. The methods 56, 58 and 60 may be implemented as modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

With specific reference to FIG. 3A, the method 56 might be incorporated into an application such as, for example, one or more of the applications 10 (FIG. 1), the first application 22 (FIG. 2), the second application 48 (FIG. 2), and so forth. Illustrated processing block 62 provides for creating a graphics workload, wherein the graphics workload may be submitted to a work queue at block 64. Block 66 may write to or otherwise trigger a doorbell assigned to the application to alert the system to the availability of the graphics workload.

With specific reference to FIG. 3B, the method 58 may be incorporated into a memory device monitor such as, for example, the monitor 32 (FIG. 2), already discussed. In the illustrated example, block 68 detects a doorbell trigger such as a cache line write and the application associated with the doorbell is identified at block 70. The application may lack system level privileges. Illustrated block 72 issues a notification of the workload submission by the identified application directly to a controller having system level privileges.

With specific reference to FIG. 3C, the method 60 may be incorporated into a controller such as, for example, the controller 12 (FIG. 1), the controller 34 (FIG. 2), and so forth. Illustrated processing block 74 provides for receiving a notification (e.g., DPC, interrupt) of a workload submission by an application lacking system level privileges. In general, a controller having system level privileges may be used to transfer the workload submission to a graphics hardware component for execution. More particularly, the workload submission may be retrieved from a work queue associated with the application at block 76, wherein the workload submission may be parsed at block 78 to obtain one or more commands. Block 78 may include, for example, modifying at least one of the one or more commands, adding at least one command to the one or more commands, prioritizing the one or more commands, etc., or any combination thereof. Additionally, the one or more commands may be added to a submission queue associated with the graphics hardware component at block 80. The one or more commands may be transferred at block 82 from the submission queue to the graphics hardware component in accordance with a graphics submission policy (e.g., timer expiration, work completion events).

Figure 4:
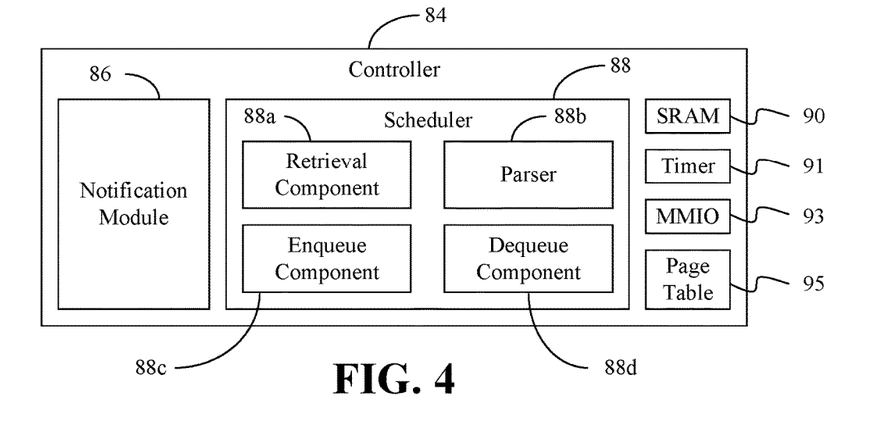
FIG. 4 is a block diagram of an example of a controller according to an embodiment.

FIG. 4 shows a controller 84 that may be configured to manage graphics workloads. The controller 84 may be readily substituted for the controller 12 (FIG. 1) and/or the controller 34 (FIG. 2), and may implement one or more aspects of the method 60 (FIG. 3C). In the illustrated example, a notification module 86 receives notifications (e.g., interrupts) of workload submissions by applications lacking system level privileges and a scheduler 88 (88*a*-88*d*) may schedule the transfer of the workload submissions to one or more graphics hardware components for execution. The scheduler 88 and/or the controller 84 may have system level privileges. As already noted, the transfer of the workload submissions may bypass the OS as well as the KMD associated with the graphics hardware components.

In one example, the scheduler 88 includes a retrieval component 88*a* to retrieve the workload submissions from work queues associated with the applications and a parser 88*b* to parse the workload submissions to obtain commands. The parser 88*b* may, for example, modify commands, add commands, prioritize commands, and so forth. The scheduler 88 may also include an enqueue component 88*c* to add the commands to submission queues associated with the one or more graphics hardware components and a dequeue component 88*d* to transfer the commands from the submission queues to the one or more graphics hardware components in accordance with a graphics submission policy. The graphics submission policy may involve, for example, determining whether a timer has expired, determining whether work completion events have occurred, and so forth. In addition, firmware/code and the necessary data structures to operate the notification module 86 and/or scheduler 88 may be stored in internal static random access memory (SRAM) 90 or other suitable memory to minimize the impact on system memory latency. The controller 84 may also include a timer 91, memory mapped input/output (MMIO) 93, page table 95, and so forth, to facilitate graphics workload management operations.

Figure 5:
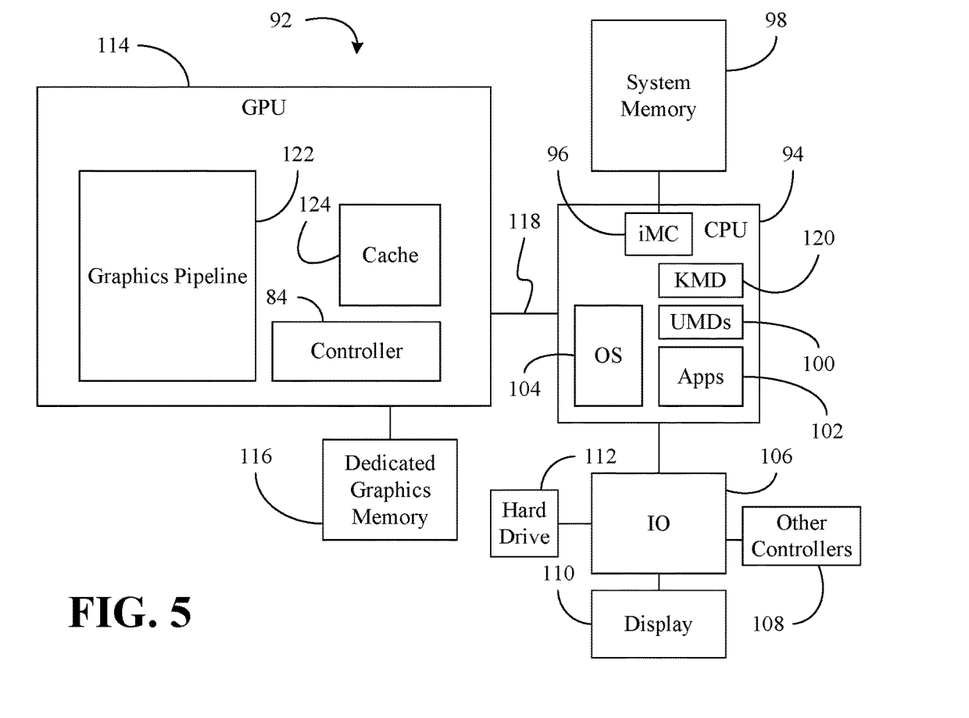
FIG. 5 is a block diagram of an example of a system according to an embodiment.

Turning now to FIG. 5, a computing system 92 is shown, wherein the system 92 may be part of a mobile platform such as a laptop, mobile Internet device (MID), personal digital assistant (PDA), media player, imaging device, wearable computer, etc., any smart device such as a smart phone, smart tablet, smart TV (television) and so forth, or any combination thereof. The system 92 may also be part of a fixed platform such as a personal computer (PC), server, workstation, etc. The illustrated system 92 includes a central processing unit (CPU, e.g., host processor) 94 with an integrated memory controller (iMC) 96 that provides access to system memory 98, which may include, for example, double data rate (DDR) synchronous dynamic random access memory (SDRAM, e.g., DDR3 SDRAM JEDEC Standard JESD79-3C, April 2008) modules. The modules of the system memory 98 may be incorporated, for example, into a single inline memory module (SIMM), dual inline memory module (DIMM), small outline DIMM (SODIMM), and so on.

The CPU 94 may also have one or more user mode drivers (UMDs) 100 loaded by one or more executing applications 102 that lack system level privileges, as well as one or more processor cores (not shown), where each core may be fully functional with instruction fetch units, instruction decoders, level one (L1) cache, execution units, and so on. In one example, the applications 102 and/or the UMDs 100 are configured to create graphics workloads, submit the graphics workloads to work queues and write to/trigger associated doorbells. The CPU 94 may alternatively communicate with an off-chip variation of the iMC 96, also known as a Northbridge, via a front side bus or a point-to-point fabric that interconnects each of the components in the system 92. In one example, the iMC 96 includes a monitor such as, for example, the monitor 32 (FIG. 2) configured to detect the doorbell triggers, identify the applications associated with the doorbell triggers, and issue notifications of the workload submissions by the identified applications directly to the controller 84 having system level privileges. The CPU 94 may also execute an operating system (OS) 104.

The illustrated CPU 94 communicates with an input/output (IO) module 106, also known as a Southbridge, via a bus. The iMC 96/CPU 94 and the IO module 106 are sometimes referred to as a chipset. The CPU 94 may also be operatively connected to a network (not shown) via a network port through the IO module 106 and various other controllers 108. Thus, the other controllers 108 may provide off-platform communication functionality for a wide variety of purposes such as wired communication or wireless communication including, but not limited to, cellular telephone (e.g., Wideband Code Division Multiple Access, W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11, 2007 Edition), Bluetooth (e.g., IEEE 802.15.1-2005, Wireless Personal Area Networks), WiMax (e.g., IEEE 802.16-2004), Global Positioning System (GPS), spread spectrum (e.g., 900 MHz), and other radio frequency (RF) telephony purposes. The IO module 106 may also communicate with a display 110 to provide for the visual output/presentation of video, images, and other content. The other controllers 108 may also communicate with the IO module 106 to provide support for user interface devices (not shown) such as a keypad, mouse, etc., in order to allow a user to interact with and perceive information from the system 92.

The IO module 106 may also have internal controllers (not shown) such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated 10 module 106 is also coupled to storage, which may include a hard drive 112, read only memory (ROM), optical disk, flash memory (not shown), etc.

The illustrated system 92 also includes a dedicated graphics processing unit (GPU, graphics processor) 114 coupled to a dedicated graphics memory 116. The dedicated graphics memory 116 may include, for example, GDDR (graphics DDR) or DDR SDRAM modules, or any other memory technology suitable for supporting graphics rendering. The GPU 114 and graphics memory 116 might be installed on a graphics/video card, wherein the GPU 114 may communicate with the CPU 94 via a graphics bus 118 such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card and/or GPU 114 may be integrated onto a system motherboard, into the main CPU 94 die (e.g., in an integrated GPU/iGPU configuration), configured as a discrete card on the motherboard, etc. The CPU 94 may also execute a kernel mode driver (KMD) 120, and the GPU 114 may include a graphics pipeline 122 and an internal cache 124 to store instructions and other data.

Alternatively, the GPU 114 may lack a dedicated graphics memory and instead share the system memory 98 with the CPU 94. Such a configuration might be used for integrated graphics architectures in which the GPU 114 and the CPU 94 are part of the same die (e.g., and connected through an appropriate interface).

The illustrated GPU 114 also includes the controller 84, which may be configured to receive notifications of the workload submissions and schedule the transfer of the workload submissions to graphics hardware components such as, for example, the graphics pipeline 122. The transfers may bypass the OS 104 as well as the KMD 120. Additionally, although the controller 84 is illustrated as residing on the GPU 114, the controller 84 may be alternatively located elsewhere in the system 92 such as, for example, on the CPU 94 or on another chip.

Figure 6:
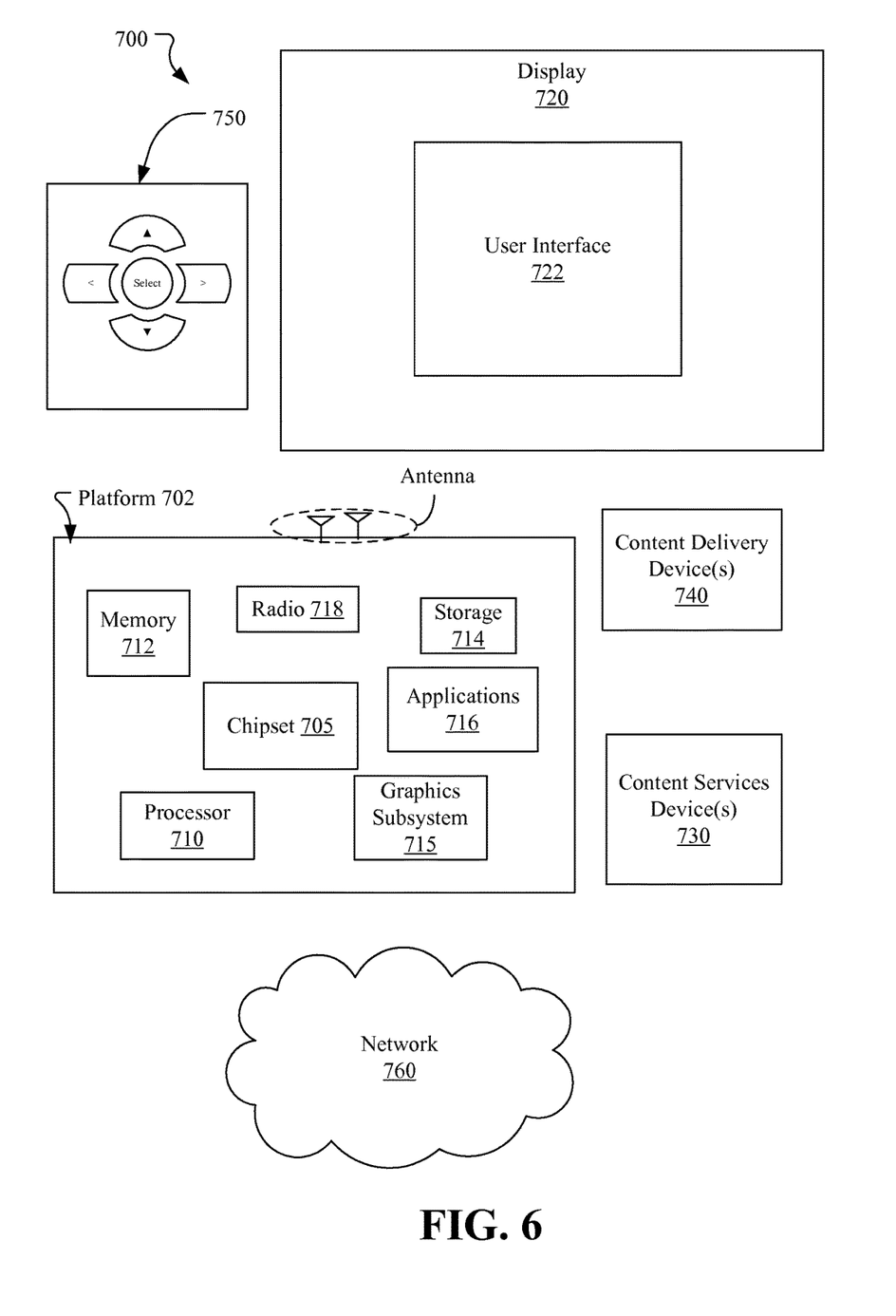
FIG. 6 is a block diagram of an example of a system having a navigation controller according to an embodiment.

FIG. 6 illustrates an embodiment of a system 700. In embodiments, the system 700 may be a media system although system 700 is not limited to this context. For example, the system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, the storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. The graphics subsystem 715 may therefore include the GPU 114 (FIG. 5), already discussed. In addition, the processor 710 may be configured to include the CPU 94 (FIG. 5), already discussed. An analog or digital interface may be used to communicatively couple the graphics subsystem 715 and display 720. For example, the interface may be any of a High-Definition Multimedia Interface (HDMI), MIPI (Mobile Industry Processor Interface), WiGIG (Wireless Gigabit Alliance), DisplayPort, wireless HDMI, and/or wireless HD compliant techniques. The graphics subsystem 715 may be integrated into processor 710 or chipset 705. The graphics subsystem 715 may be a stand-alone card communicatively coupled to the chip set 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
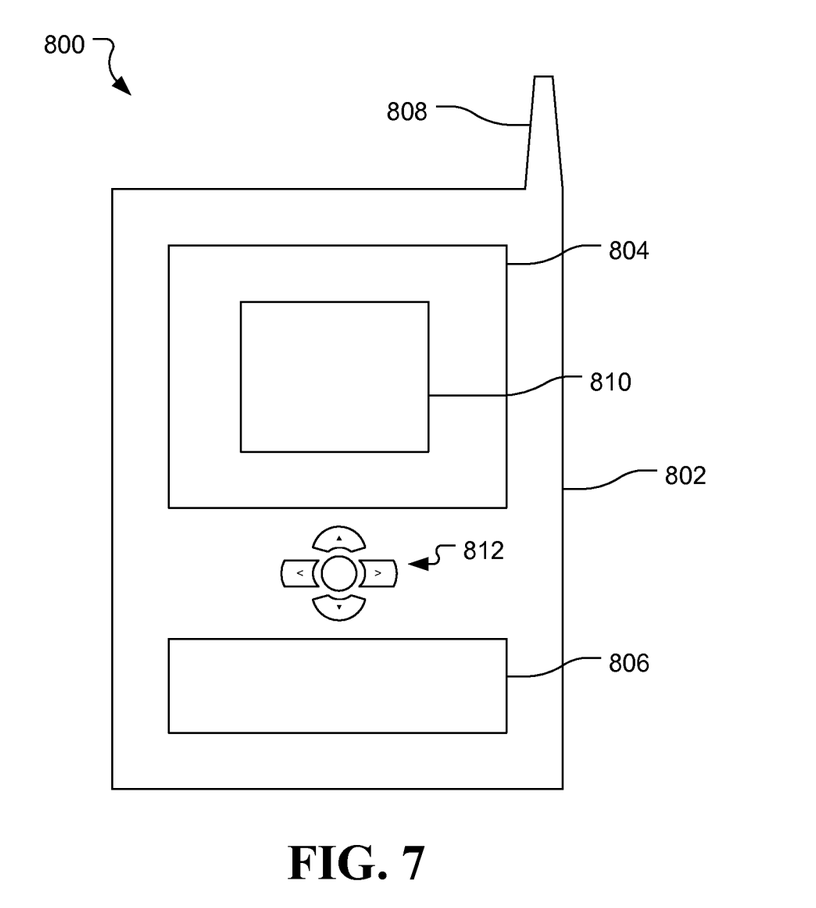
FIG. 7 is a block diagram of an example of a system having a small form factor according to an embodiment.

As described above, the system 700 may be embodied in varying physical styles or form factors. FIG. 7 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

Additional Notes and Examples

Example 1 may include a system to manage graphics workloads, comprising a graphics hardware component, a host processor to execute an application lacking system level privileges, a memory device to issue a notification of a workload submission by the application, and a controller. The controller may include a notification module to receive the notification of the workload submission and a scheduler to schedule a transfer of the workload submission to the graphics hardware component for execution.

Example 2 may include the system of Example 1, wherein the transfer is to bypass an operating system associated with the host processor.

Example 3 may include the system of Example 1, wherein the transfer is to bypass a kernel mode driver associated with the graphics hardware component.

Example 4 may include the system of Example 1, wherein the notification is to be an interrupt.

Example 5 may include the system of any one of Examples 1 to 4, wherein the scheduler includes a retrieval component to retrieve the workload submission from a work queue associated with the application, a parser to parse the workload submission to obtain one or more commands, an enqueue component to add the one or more commands to a submission queue associated with the graphics hardware component, and a dequeue component to transfer the one or more commands from the submission queue to the graphics hardware component in accordance with a graphics submission policy.

Example 6 may include the system of Example 5, wherein the parser is to modify at least one of the one or more commands, add at least one command to the one or more commands, and prioritize the one or more commands.

Example 7 may include a method of operating a controller, comprising receiving, at the controller, a notification of a workload submission by an application lacking system level privileges and using the controller to schedule a transfer of the workload submission to a graphics hardware component for execution, wherein the controller has system level privileges.

Example 8 may include the method of Example 7, wherein the transfer bypasses an operating system.

Example 9 may include the method of Example 7, wherein the transfer bypasses a kernel mode driver associated with the graphics hardware component.

Example 10 may include the method of Example 7, wherein the notification is an interrupt.

Example 11 may include the method of any one of Examples 7 to 10, wherein using the controller to schedule the transfer includes retrieving the workload submission from a work queue associated with the application, parsing the workload submission to obtain one or more commands, adding the one or more commands to a submission queue associated with the graphics hardware component, and transferring the one or more commands from the submission queue to the graphics hardware component in accordance with a graphics submission policy.

Example 12 may include the method of Example 11, wherein parsing the workload submission includes modifying at least one of the one or more commands, adding at least one command to the one or more commands, and prioritizing the one or more commands.

Example 13 may include a controller to manage graphics workloads, comprising a notification module to receive a notification of a workload submission by an application lacking system level privileges and a scheduler to schedule a transfer of the workload submission to a graphics hardware component for execution, wherein the scheduler has system level privileges.

Example 14 may include the controller of Example 13, wherein the transfer is to bypass an operating system.

Example 15 may include the controller of Example 13, wherein the transfer is to bypass a kernel mode driver associated with the graphics hardware component.

Example 16 may include the controller of Example 13, wherein the notification is to be an interrupt.

Example 17 may include the controller of any one of Examples 13 to 16, wherein the scheduler includes a retrieval component to retrieve the workload submission from a work queue associated with the application, a parser to parse the workload submission to obtain one or more commands, an enqueue component to add the one or more commands to a submission queue associated with the graphics hardware component, and a dequeue component to transfer the one or more commands from the submission queue to the graphics hardware component in accordance with a graphics submission policy.

Example 18 may include the controller of Example 17, wherein the parser is to modify at least one of the one or more commands, add at least one command to the one or more commands, and prioritize the one or more commands.

Example 19 may include at least one computer readable storage medium comprising a set of instructions which, when executed by a controller, cause the controller to receive a notification of a workload submission by an application lacking system level privileges and schedule a transfer of the workload submission to a graphics hardware component for execution, wherein the controller is to have system level privileges.

Example 20 may include the at least one computer readable storage medium of Example 19, wherein the transfer is to bypass an operating system.

Example 21 may include the at least one computer readable storage medium of Example 19, wherein the transfer is to bypass a kernel mode driver associated with the graphics hardware component.

Example 22 may include the at least one computer readable storage medium of Example 19, wherein the notification is to be an interrupt.

Example 23 may include the at least one computer readable storage medium of any one of Examples 19 to 22, wherein the instructions, when executed, cause the controller to retrieve the workload submission from a work queue associated with the application, parse the workload submission to obtain one or more commands, add the one or more commands to a submission queue associated with the graphics hardware component, and transfer the one or more commands from the submission queue to the graphics hardware component in accordance with a graphics submission policy.

Example 24 may include the at least one computer readable storage medium of Example 23, wherein the instructions, when executed, cause the controller to modify at least one of the one or more commands, add at least one command to the one or more commands, and prioritize the one or more commands.

Example 25 may include a controller to manage graphics workloads, comprising means for performing the method of any of Examples 7 to 12.

Techniques described herein may therefore offload GPU scheduling from the OS and kernel mode driver. Such an approach may provide low dispatch overhead/latency, advance tasking/queuing options (e.g., out of order execution, GPU based submission/preemption/reenqueue), etc., without leading to privilege escalation for user mode applications. Additionally, legacy workloads submitted through traditional OS/driver paths may be supported, while preserving OS required semantics (e.g., in order requirements) and other OS support functions. Moreover, priority based scheduling options may enable high priority work to be executed sooner and fair scheduling may be achieved among all contexts (including interleaving direct and OS submissions). In addition, a control interface with the KMD may manage the sharing of context data, virtualization of scarce hardware resources, handling of "edge cases" involving corrupt and/or crashed applications, etc. Techniques may also enable low execution overhead of firmware on the controller to meet dispatch latency goals and ensure that firmware isn't a limiting factor with respect to achieving full GPU utilization. Indeed, minimal workload parsing and the use of SRAM internal to the controller to store code and key data structures may reduce system memory latency.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising: a graphics hardware component; a host processor to execute an application lacking system level privileges; a memory device to detect a triggering of a doorbell, to identify the application based on an address of the doorbell, and to issue a notification of a workload submission by the application; a controller including, a notification module to receive the notification of the workload submission; and a scheduler to schedule a transfer of the workload submission to the graphics hardware component for execution, wherein the transfer is to bypass an operating system associated with the host processor, and wherein the scheduler includes a parser to, parse the workload submission to obtain one or more commands, modify at least one of the one or more commands, add at least one command to the one or more commands, prioritize the one or more commands, and prevent one or more untrusted applications from submitting privileged commands to the graphics hardware component.

2. The system of claim 1, wherein the transfer is to bypass a kernel mode driver associated with the graphics hardware component.

3. The system of claim 1, wherein the notification is to be an interrupt.

4. The system of claim 1, wherein the scheduler further includes:
a retrieval component to retrieve the workload submission from a work queue associated with the application;
an enqueue component to add the one or more commands to a submission queue associated with the graphics hardware component; and
a dequeue component to transfer the one or more commands from the submission queue to the graphics hardware component in accordance with a graphics submission policy.

5. A method of operating a controller, comprising:
receiving, at the controller, a notification of a workload submission by an application lacking system level privileges, wherein the notification is issued by a memory device when detecting a triggering of a doorbell;
parsing the workload submission to obtain one or more commands, modifying at least one of the one or more commands, adding at least one command to the one or more commands, and prioritizing the one or more commands, wherein the parsing of the workload submission includes preventing one or more untrusted applications from submitting privileged commands to a graphics hardware component; and
using the controller to schedule a transfer of the workload submission to the graphics hardware component for execution, wherein the controller has system level privileges, wherein the transfer bypasses an operating system.

6. The method of claim 5, wherein the transfer bypasses a kernel mode driver associated with the graphics hardware component.

7. The method of claim 5, wherein the notification is an interrupt.

8. The method of claim 5, wherein using the controller to schedule the transfer includes:
retrieving the workload submission from a work queue associated with the application;
adding the one or more commands to a submission queue associated with the graphics hardware component; and
transferring the one or more commands from the submission queue to the graphics hardware component in accordance with a graphics submission policy.

9. A controller comprising: a notification module to receive a notification of a workload submission by an application lacking system level privileges, wherein the notification is issued by a memory device when detecting a triggering of a doorbell;
a parser to parse the workload submission to obtain one or more commands, modify at least one of the one or more commands, add at least one command to the one or more commands, and prioritize the one or more commands, wherein to parse the workload submission is to include a prevention of one or more untrusted applications from submitting privileged commands to a graphics hardware component; and
a scheduler to schedule a transfer of the workload submission to the graphics hardware component for execution, wherein the scheduler has system level privileges, wherein the transfer is to bypass an operating system.

10. The controller of claim 9, wherein the transfer is to bypass a kernel mode driver associated with the graphics hardware component.

11. The controller of claim 9, wherein the notification is to be an interrupt.

12. The controller of claim 9, wherein the scheduler includes:
a retrieval component to retrieve the workload submission from a work queue associated with the application;
an enqueue component to add the one or more commands to a submission queue associated with the graphics hardware component; and
a dequeue component to transfer the one or more commands from the submission queue to the graphics hardware component in accordance with a graphics submission policy.

13. At least one non-transitory computer readable storage medium comprising a set of instructions which, when executed by a controller, cause the controller to: receive a notification of a workload submission by an application lacking system level privileges, wherein the notification is issued by a memory device when detecting a triggering of a doorbell;
parse the workload submission to obtain one or more commands, modify at least one of the one or more commands, add at least one command to the one or more commands, and prioritize the one or more commands, wherein the parse of the workload submission includes a prevention of one or more untrusted applications from submitting privileged commands to a graphics hardware component; and
schedule a transfer of the workload submission to the graphics hardware component for execution, wherein the controller is to have system level privileges, wherein the transfer is to bypass an operating system.

14. The at least one non-transitory computer readable storage medium of claim 13, wherein the transfer is to bypass a kernel mode driver associated with the graphics hardware component.

15. The at least one non-transitory computer readable storage medium of claim 13, wherein the notification is to be a deferred procedure call.

16. The at least one non-transitory computer readable storage medium of claim 13, wherein the instructions, when executed, cause the controller to:
retrieve the workload submission from a work queue associated with the application;

add the one or more commands to a submission queue associated with the graphics hardware component; and
transfer the one or more commands from the submission queue to the graphics hardware component in accordance with a graphics submission policy.

\* \* \* \* \*